United States Patent [19]

Pincus

[11] 3,721,909

[45] March 20, 1973

[54] PHASE AND FREQUENCY COMPARATOR FOR SIGNALS UNAVAILABLE SIMULTANEOUSLY

[75] Inventor: Ralph M. Pincus, Paramus, N.J.

[73] Assignee: The Bendix Corporation, Teterboro, N.J.

[22] Filed: Dec. 7, 1970

[21] Appl. No.: 95,786

[52] U.S. Cl. ......................328/133, 331/14, 307/233

[51] Int. Cl. ..................................................H03b 3/04

[58] Field of Search............331/14, 16, 17, 172, 173; 307/232, 233; 328/133, 134; 324/186

[56] References Cited

UNITED STATES PATENTS

| | | | |
|---|---|---|---|
| 3,534,285 | 10/1970 | Kobold et al. | 331/14 |
| 3,059,187 | 10/1962 | Jaffe | 331/14 |
| 2,838,673 | 6/1958 | Fernsler et al. | 331/14 |
| 3,195,068 | 7/1965 | Vall | 307/232 |
| 3,221,260 | 11/1965 | Henrion | 307/233 |
| 3,308,387 | 3/1967 | Hackett | 307/233 |
| 3,430,149 | 2/1969 | Williams | 307/233 |
| 3,555,446 | 1/1971 | Braymer | 331/14 |
| 3,566,155 | 2/1971 | De Maio | 328/133 |
| 3,012,201 | 12/1961 | Morphett | 328/134 |
| 3,136,900 | 6/1964 | Bell | 328/133 |
| 3,265,976 | 8/1966 | Broadhead | 328/134 |
| 3,308,387 | 3/1967 | Hackett | 328/133 |
| 3,599,014 | 8/1971 | Carp | 328/133 |
| 3,049,631 | 8/1962 | Taylor | 307/295 |

*Primary Examiner*—Herman Karl Saalbach
*Assistant Examiner*—R. E. Hart
*Attorney*—Anthony F. Cuoco and Plante, Hartz, Smith and Thompson

[57] ABSTRACT

A phase and frequency comparator for input signals unavailable simultaneously includes a channel for each of the signals, each channel having a wave shaper for providing a square wave corresponding to the signal, a storage counter driven by the wave shaper and an oscillator driven by the storage counter and connected in feedback relation to the counter so that the counter output is zero when the oscillator frequency equals the square wave frequency, with means provided for thereupon rendering the oscillator output frequency constant. The oscillator output is synchronized by the input signal and since the oscillator output is steadily available a conventional phase and/or frequency comparison can be made.

7 Claims, 4 Drawing Figures

INVENTOR.
RALPH M. PINCUS
BY
ATTORNEY

PHASE AND FREQUENCY COMPARATOR FOR SIGNALS UNAVAILABLE SIMULTANEOUSLY

BACKGROUND OF THE INVENTION

1. Field of the Invention

This invention relates to phase and frequency comparators and, more particularly, to phase and frequency comparators for signals that are not available simultaneously.

2. Description of the Prior Art

The condition of not having signals available simultaneously for phase or frequency comparison presents itself in numerous multiplex operations, in instances of modulated signals or in equipment where the expense of making the desired signals available simultaneously is prohibitive.

SUMMARY OF THE INVENTION

This invention contemplates apparatus wherein a plurality of alternating signals which are not available simultaneously are each applied to a network including a shaping circuit which converts the applied signal to a square wave. The output of the shaping circuit serves as an input to a storage counter, which controls an integrator, which in turn controls an oscillator. The oscillator output is fed back to the counter so that the counter output is zero when the oscillator frequency equals the frequency of the applied signal. When the counter output is zero the integrator output is constant as is the output frequency of the oscillator. When the applied signal is unavailable a signal sensor energizes a relay which maintains the integrator input at ground potential until the applied signal is again available. The applied signal is used to synchronize the oscillator output, and since the oscillator output is constantly available a conventional phase or frequency comparison can be made with another oscillator output or with a steadily available signal.

One object of this invention is to provide means for comparing phase and frequency signals not available simultaneously.

Another object of this invention is to determine the phase relationship between signals where the frequency of the signals varies simulataneously and the signals are not available simultaneously.

Another object of this invention is to measure the frequency difference between signals not available simultaneously.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawing is for illustration purposes only and is not to be construed as defining the limits of the invention.

DESCRIPTION OF THE INVENTION

Figure 1:
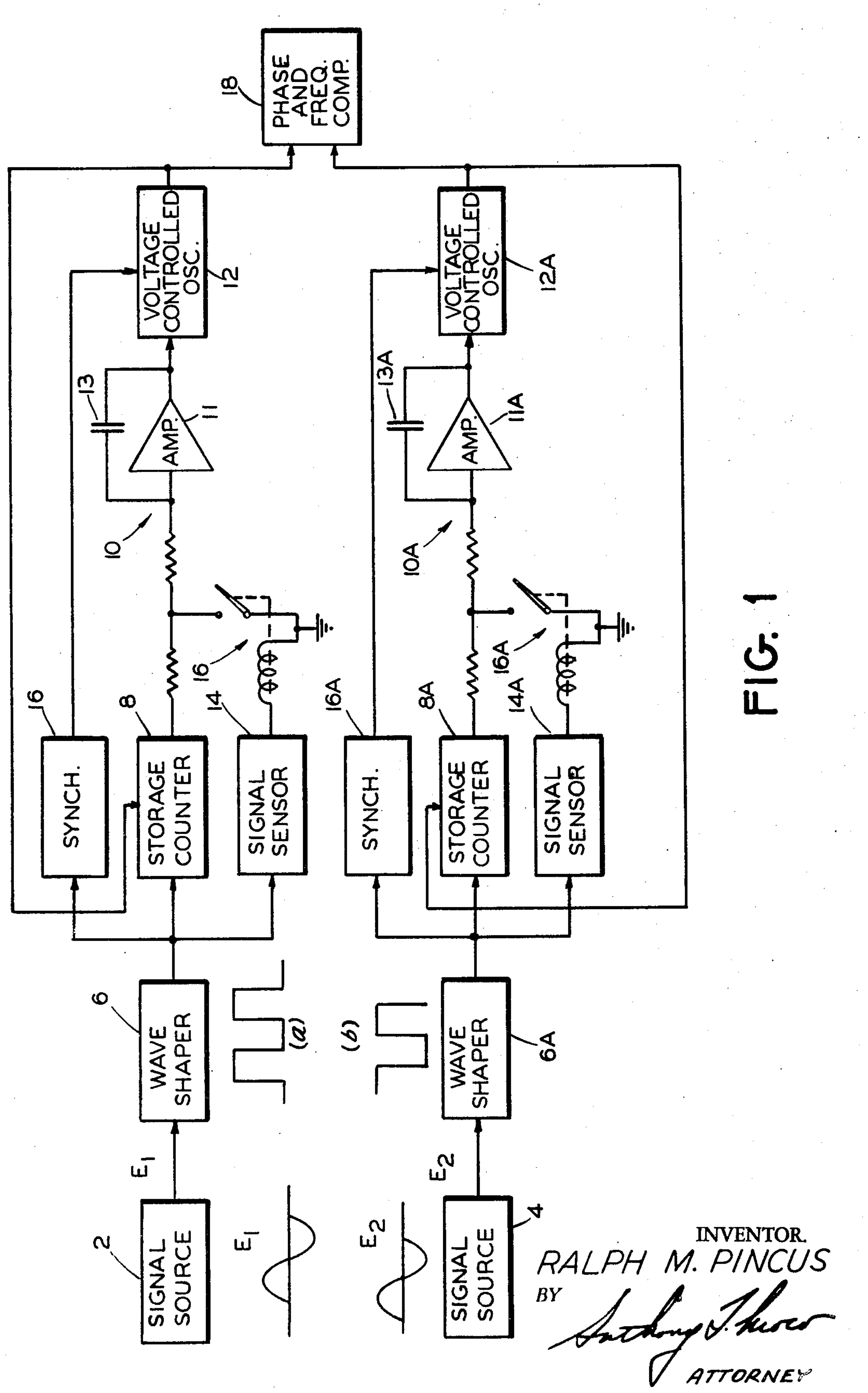
FIG. 1 is a block diagram of a phase and frequency comparator according to the invention.

With reference to FIG. 1, a signal source 2 provides an alternating signal $E_1$ and a signal source 4 provides an alternating signal $E_2$ out of phase with signal $E_1$. For purposes of describing the present invention it will be assumed that signals $E_1$ and $E_2$ have the same frequency and that this frequency and the phase of the signals are unknown so that a normal frequency or phase comparison can not be made.

Signal $E_1$ is applied to a wave shaper 6 which may be a conventional type zero crossing detector including an appropriate instrument operational amplifier with clipping and biasing circuits such as described in the Fairchild Semiconductor Company Catalog of June, 1970 and carrying their designation, ω A725. Wave shaper 6 provides a square wave output with an accurately controlled amplitude and having a wave form designated as *a* in FIG. 1.

Output *a* is applied to a storage counter designated generally by the numeral 8 which converts the frequency of the square wave to a charge. Storage counter 8 is shown in substantial detail in FIG. 2 and will be more fully described with reference thereto.

A high gain, low drift integrator 10 which includes an operational amplifier 11 and a capacitor 13 connected in feedback relation to the amplifier integrates the output of storage counter 8. Integrator 10 will be recognized as a conventional type such as described at page 17, *Pulse, Digital and Switching Wave Forms*, Millman and Taub, McGraw Hill, 1965.

Integrator 10 controls a voltage controlled oscillator 12 which may be a conventional type astable multivibrator such as described at page 439, FIG. 11–23 *Pulse, Digital and Switching Wave Forms*, supra.

Oscillator 12 is connected in feedback relation to storage counter 8, so that the output of the storage counter is zero when the output frequency of oscillator 12 equals the unknown frequency of wave form *a* and hence the frequency of signal E. When the output of storage counter 8 is zero the output of integrator 10 is constant and the output frequency of oscillator 12 is likewise constant.

Similarly, signal $E_2$ is applied to a wave shaper 6A with the output of wave shaper 6A being designated as *b* in FIG. 1. Output *b* is applied to a storage counter 8A which converts the frequency of the square wave to a charge.

An integrator 10A including an amplifier 11A and a capacitor 13A connected in feedback relation to the amplifier integrates the output from storage counter 8A.

Integrator 10A controls an oscillator 12A which is connected in feedback relation to storage counter 8A so that the output of the storage counter is zero when the output frequency of oscillator 12A equals the unknown frequency of wave form *b* and hence the frequency of signal $E_2$. When the output of storage counter 8A is zero the output of integrator 10A is constant and the output frequency of oscillator 12A is also constant.

The output from wave shaper 6 is applied to a signal sensor 14 and the output of wave shaper 6A is applied to a signal sensor 14A. Signal sensors 14 and 14A sense the absence of signals *a* and *b*, respectively, and operate switches 16 and 16A, respectively, for connecting integrators 10 and 10A to ground whereupon the output frequency of oscillators 12 and 12A remains constant.

The output from wave shaper 6 is applied to a synchronizer 16 and the output from wave shaper 6A is applied to a synchronizer 16A. Synchronizers 16 and 16A are conventional type differention circuits such as described at pages 38–42 *Pulse, Digital and Switching Wave Forms*, supra. The output from synchronizer 16 is applied to oscillator 12 for providing a constant phase relationship between wave form *a* and the output of the oscillator and the output from synchronizer 16A is applied to oscillator 12A for establishing a constant phase relationship between wave form *b* and the output of the oscillator. The oscillators are of the type which maintain constant phase for extended intervals.

The output from oscillator 12 and 12A, which are now available on a steady basis, may be applied to a conventional type comparator 18 which compares the phase and/or frequency of the oscillator outputs, and which comparison is, in affect, a comparison of the phase and/or frequency of signal $E_1$ and $E_2$.

It will be understood that all elements shown in FIG. 1 carrying the notation A are similar in all respects to like numbered elements shown in the figure and without said notation.

Figure 2A:
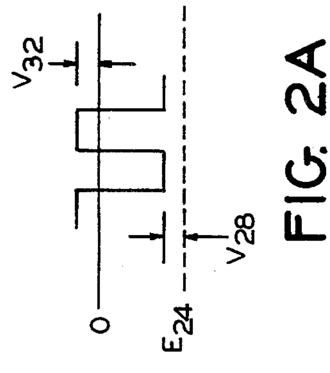
FIG. 2A and 2B are diagrammatic representations of wave forms provided at various stages of operation of the storage counter of FIG. 2.
Figure 2B:
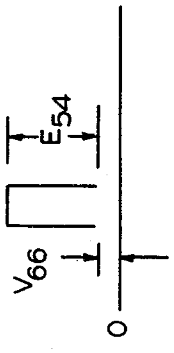
Figure 2:
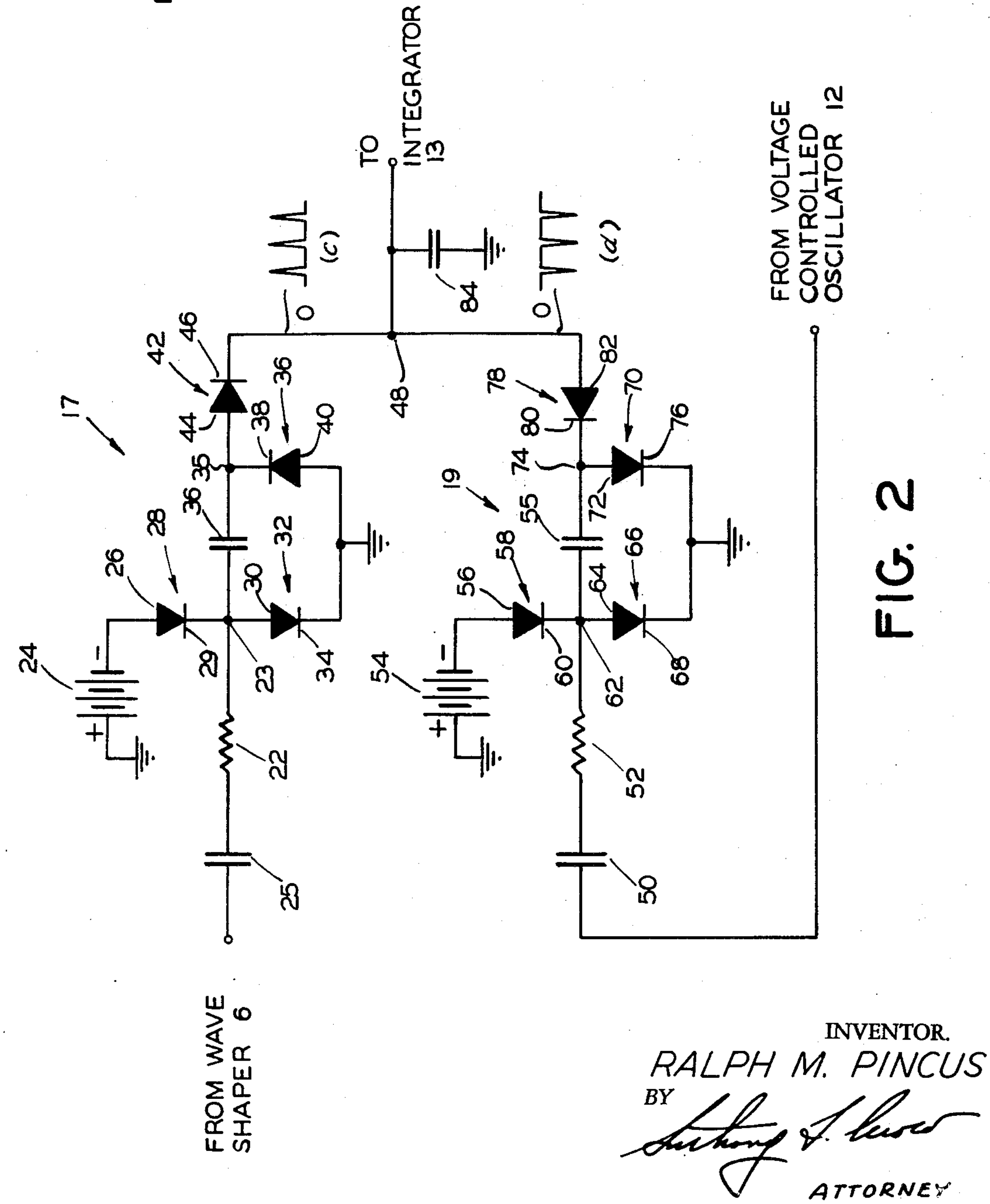
FIG. 2 is an electrical schematic diagram of the storage counter shown generally in FIG. 1.

With reference to FIG. 2, there is shown in substantial detail a storage counter such as the storage counters 8 and 8A shown generally in FIG. 1.

Describing counter 8 by way of example, the counter has a network 17 connected to wave shaper 6 (FIG. 1) through a coupling capacitor 25 and an input resistor 22.

A clamping circuit included in the counter has a source of negative direct current shown as a battery 24 connected to an anode 26 of a diode 28. A cathode 29 of diode 28 is connected to resistor 22 at a point 23 and to an anode 30 of a diode 32 at said point 23. Diode 32 has a grounded cathode 34.

A coupling capacitor 36 has one plate connected to point 23 and the other point connected to a point 35 and to an anode 44 of a charging diode 42 having a cathode 46 connected to a point 48, and at which cathode is provided a signal having a wave form *c*. A d.c. restoring diode 36 has a cathode 38 connected to point 35, and has a grounded anode 40.

The storage counter has a network 19 connected to voltage controlled oscillator 12 through a coupling capacitor 50 and a load resistor 52. A clamping circuit included in the counter has a negative source of direct current shown as a battery 54 connected to an anode 56 of a diode 58, and which diode 58 has a cathode 60 connected at a point 62 to resistor 52. A diode 66 has an anode 64 connected to point 62 and a cathode 68 connected to ground.

A coupling capacitor 55 has one plate connected to point 62 and another plate connected to a point 74. A charging diode 78 has an anode 82 connected to point 48 and a cathode connected to point 74, and at which anode is provided a signal having a wave form *d*. A d.c. restoring diode 70 has an anode 72 connected to point 74 and a grounded cathode 76.

A bucket capacitor 84 is connected to point 48 and accumulates a charge corresponding to the frequency difference between signals *c* and *d* shown in FIG. 2.

FIG. 2A shows the wave form of the signal charged and discharged by capacitor 25. Thus, the signal is positive by an amount $V_{32}$ due to diode 32 and is negative by an amount $(E_{24} - V_{28})$, where $E_{24}$ is the supply voltage from battery 24 and $V_{28}$ is due to diode 28.

FIG. 2B shows the wave form of the signal charged and discharged by capacitor 50. Thus the signal is positive by an amount $V_{66}$ due to diode 66 and has an amplitude $E_{54}$ which is the supply voltage from battery 54.

Capacitor 36 will charge to the supply voltage $E_{24}$ and discharge said voltage into capacitor 84 each cycle. Since diodes 76 and 82 in counter network 19 are connected in reverse relation to corresponding diodes 40 and 42 in network 17, this charge is removed for a null by the action of network 19 each cycle. Similarly the charged loaded into capacitor 84 by network 19 is removed for a null by network 17. This continuous loading and unloading of capacitor 84 is accomplished by the positive and negative pulse *c* and *d*, respectively, shown in FIG. 2.

Storage counters such as the counters 8 and 8A used in the invention are well known in the art and a more complete description of their operation is given at pages 706–713, *Pulse, Digital and Switching Wave Forms*, supra.

In the invention described, two signal channels have been used to accommodate random appearance and reappearance of signals $E_1$ and $E_2$. If one of the signals is steadily available, then, of course only a single channel is needed.

The apparatus disclosed may also be utilized to determine the phase relationship between signals whose frequencies vary simultaneously and when both signals are not available at the same time. A further application of the apparatus is to measure the frequency difference for signals not available simultaneously.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus responsive to the phase and frequency of an alternating signal provided by a signal means, comprising:

a wave shaper connected to the signal means for converting alternating signal to a signal having a predetermined wave form and a frequency corresponding to the alternating signal;

a storage counter connected to the wave shaper for converting the signal having a predetermined wave form to a corresponding charge;

the storage counter including a first circuit connected to the wave shaper for converting a signal therefrom in one sense to a charge in the one sense, a second circuit connected to the wave shaper for converting a signal therefrom in an opposite sense to a charge in the opposite sense, and a capacitor connected to the first and second circuits for accumulating a charge corresponding to the frequency difference between the signals in the one and the opposite sense;

an integrator connected to the storage counter for integrating the charge therefrom;

an oscillator connected to the integrator and responsive to the integrated charge for providing a pulse train having a corresponding frequency;

the oscillator connected in feedback relation to the storage counter for affecting the storage counter so that the output therefrom is zero when the frequency of the pulse train equals the frequency of the signal having a predetermined wave form; and said counter affecting the integrator when said counter output is zero so that the integrator output is constant, and whereupon the frequency of the oscillator pulse train is likewise constant.

2. Apparatus as described by claim 1, including:

a signal sensor connected to the wave shaper for sensing the absence of a signal therefrom; and switching means connected to the signal sensor and to the integrator and connected to ground, and operated by the signal sensor when the wave shaper signal is absent for connecting the integrator to ground to render the oscillator pulse train frequency constant.

3. Apparatus as described by claim 1, including:

a synchronizer connected to the wave shaper and to the oscillator, and responsive to the wave shaper signal for synchronizing the oscillator to provide a constant phase relation between the signal from the wave shaper and the pulse train from the oscillator.

4. Apparatus as described by claim 1, wherein:

the capacitor is alternately charged and discharged by the signals in the one and the opposite senses.

5. A phase and frequency comparator for a plurality of input signals having different phases and frequencies provided by a corresponding plurality of signal sources, and which signals are unavailable simultaneously, said comparator comprising:

a channel for each of the input signals, each channel including a wave shaper connected to the corresponding signal source for providing a signal having a predetermined wave form and a frequency corresponding to the input signal, a storage counter connected to the wave shaper for converting the signal therefrom to a corresponding charge, the storage counter including a first circuit connected to the wave shaper for converting a signal therefrom in one sense to a charge in the one sense, a second circuit connected to the wave shaper for converting a signal therefrom in an opposite sense to a charge in the opposite sense, and a capacitor connected to the first and second circuits for accumulating a charge corresponding to the frequency difference between the signals in the one and the opposite senses, an oscillator connected to the storage counter and driven thereby and connected in feedback relation to the counter so that the counter output is zero when the oscillator output frequency equals the predetermined wave form frequency, and means connected to the counter and to the oscillator for rendering the oscillator output constant when the counter output is zero; and means connected to the oscillators in each of the channels for comparing the phase and frequency of the oscillator outputs, said phase and frequency corresponding to that of the corresponding input signals.

6. A comparator as described by claim 5, wherein the means connected to the counter and to the oscillator for rendering the oscillator output constant when the counter output is zero includes:

an integrator connected to the counter for integrating the charge therefrom and affected by the zero counter output for providing a constant integrator output.

7. A comparator as described by claim 5, including:

a signal sensor connected to the wave shaper for sensing the absence of a signal therefrom; and a switching device connected to the signal sensor and to the means connected to the counter and to the oscillator for rendering the oscillator output constant when the counter output is zero, and operated by the signal sensor for connecting said means to ground.

* * * * *